United States Patent [19]
Hsiao

[11] Patent Number: 5,735,148
[45] Date of Patent: Apr. 7, 1998

[54] LOCKING STRUCTURE FOR AN AUTOMOBILE TRANSMISSION SHIFT LEVER

[76] Inventor: Yung-Chi Hsiao, No.19-1 Alley 27,Lane 245, Hsi Sheng St., Hsin-Chuang City Taipei, Taiwan

[21] Appl. No.: 328,127

[22] Filed: Oct. 24, 1994

[51] Int. Cl.⁶ .................................................. B60R 25/06
[52] U.S. Cl. ..................... 70/201; 70/195; 70/197; 70/247
[58] Field of Search ................... 70/192–197, 207, 70/251, 201, 202, 237, 245–248

[56] References Cited

U.S. PATENT DOCUMENTS

| | | | |
|---|---|---|---|
| 1,082,906 | 12/1913 | Potts | 70/195 |
| 1,159,973 | 11/1915 | Marhenke | 70/195 |
| 3,583,184 | 6/1971 | Papale | 70/247 X |
| 4,747,278 | 5/1988 | Roncelli et al. | 70/201 |
| 5,329,792 | 7/1994 | Lee | 70/201 |

*Primary Examiner*—Lloyd A. Gall

[57] ABSTRACT

An auto-transmission shift lever locking structure for an automobile is disclosed. The locking structure includes a base member mounted to a free end of the shift lever and a cover member secured to the base member, defining therebetween a space for disposing therein a locking member and a U-shaped hook member. The base member is provided with a concave slot thereon. The cover member is provided with a first channel and a second channel. A locking driver has a driving rod rotatable by a key for locking or unlocking the locking device. The locking driver is mounted into the first channel of the cover member, used to operate the driving member and further control the U-shaped hook member. A shift enabling button with a spring is inserted into the second channel of the cover member to perform shifting of the transmission system when the locking structure is at unlocked position.

2 Claims, 4 Drawing Sheets

LOCKING STRUCTURE FOR AN AUTOMOBILE TRANSMISSION SHIFT LEVER

FIELD OF THE INVENTION

The invention relates generally to an automobile transmission shift lever locking device and in particular to a locking structure for locking the auto-transmission shift lever of a car. The locking structure is incorporated in the handhold knob of the auto-transmission shift lever for automatically locking the operation of the shift lever when parking the car. The locking structure includes a cover member, a base member, and associated locking members arranged on the base member, capable of effectively preventing the automobiles from being stolen.

BACKGROUND OF THE INVENTION

Nowadays, automobiles have been a most important transportation means. Accompanying the increase the number of the automobiles, especially in large cities, the car stealing problem becomes troublesome. Therefore, it is an important object to provide a safety burglary device or locking device. Conventionally, in order to prevent the automobiles from being stolen, some of the automobiles, especially the passenger cars, are devised with anti-burglary alarms which may generate an alarm signal when the automobile bodies are touched or vibrated.

There is also provided for some auto-transmission vehicles a transmission shift lever locking device which, as shown in FIG. 1 of the accompanying drawings, comprises a U-shaped member E which may be fit over the transmission shift lever, labeled by reference A in FIG. 1, and locked by a lock B which may be operable by a key C. The lock B is securely fixed on a supporting frame D, so that the U-shaped member E associated with the lock B may lock the shift lever when parking. With the use of the locking device shown in FIG. 1, the transmission shift lever A is prevented from moving and thus no shifting of the transmission system can be done. The drawback of the conventional transmission shift lever locking device is thus it requires separate locking members, such as the U-shaped member E, the lock B and the support D. This is not quite convenient in mounting and using the locking device in practice.

It is therefore desirable to provide a safety and convenient locking structure which is incorporated in the handhold knob of the auto-transmission shift lever to overcome the drawbacks of the conventional automobile transmission shift lever locking device.

SUMMARY OF THE INVENTION

The principal object of the present invention is to provide an auto-transmission shift lever locking device having a locking structure capable of securely locking the shift lever, thus effectively preventing the automobile from being stolen. The locking structure is preferably embedded in the handhold knob of the shift lever.

It is another object of the present invention to provide an auto-transmission shift lever locking device which is capable of securing the auto-transmission shift lever by means of a simple operation.

In accordance with the present invention, there is provided an auto-transmission shift lever locking device for an automobile, comprising a base member mounted to an upper free end of the shift lever and a cover member secured to the base member. The cover member and the base member define therebetween a space for disposing therein a driving member and a U-shaped hook member. The base member is provided with a concave slot thereon. The cover member is provided with a first channel and a second channel. A locking driver has a driving rod rotatable by a key for locking or unlocking the locking device. The locking driver is mounted into the first channel of the cover member, used to operate the driving member and further control the U-shape hook member. A shift enabling button with a spring is inserted into the second channel of the cover member to perform shifting of the transmission system when the locking structure is at unlocked position.

BRIEF DESCRIPTION OF THE DRAWINGS

Other objects and advantages of the invention will be apparent from the following description of preferred embodiments of the present invention taken in connection with the accompanying drawings, wherein:

FIG. 2A is a partial cross sectional view showing the inclined through slot of the shift enabling button shown in FIG. 2;

DETAILED DESCRIPTION OF THE INVENTION

Figure 1:
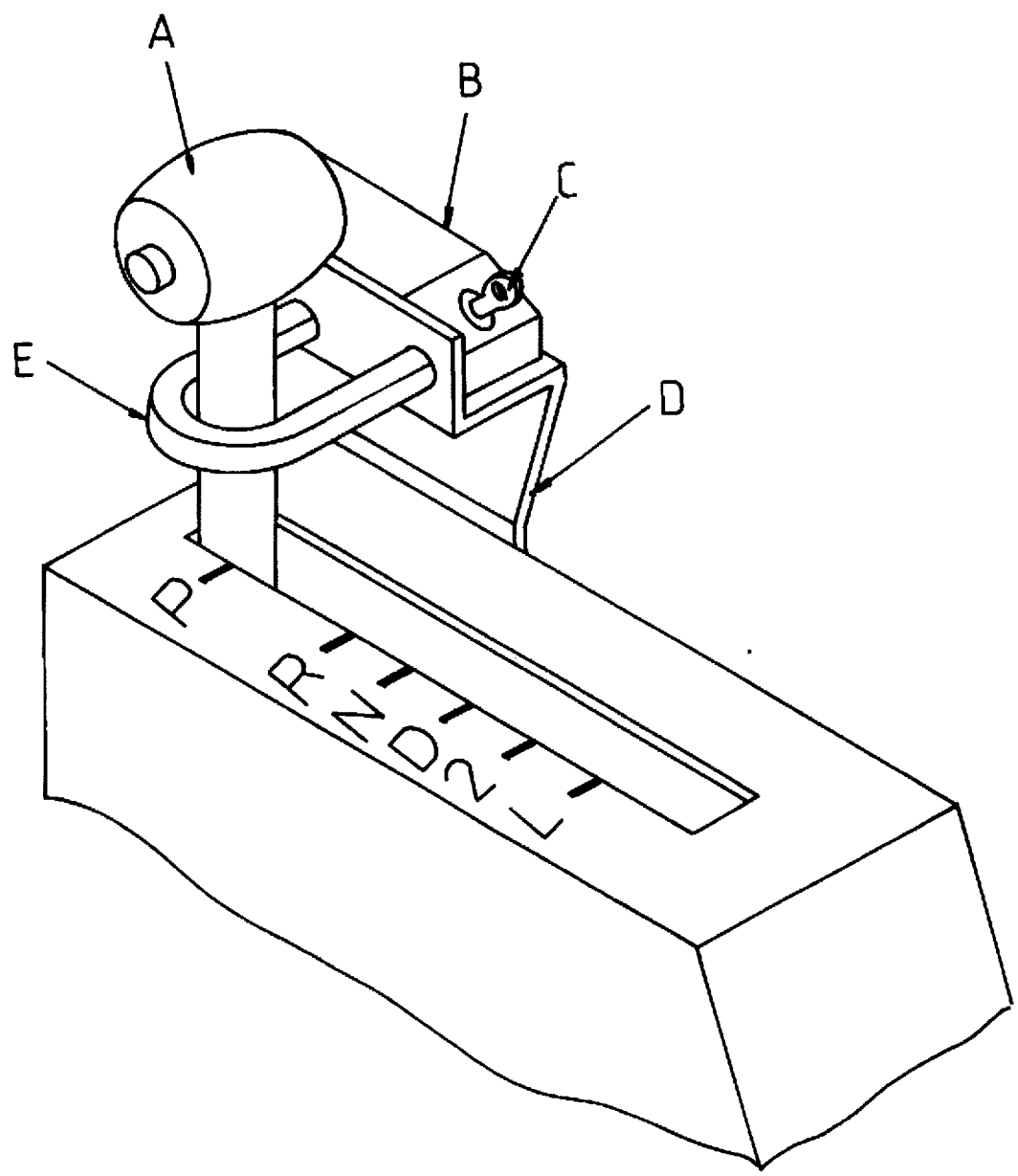
FIG. 1 is a perspective view showing a prior art auto-transmission shift lever locking device.
Figure 2:
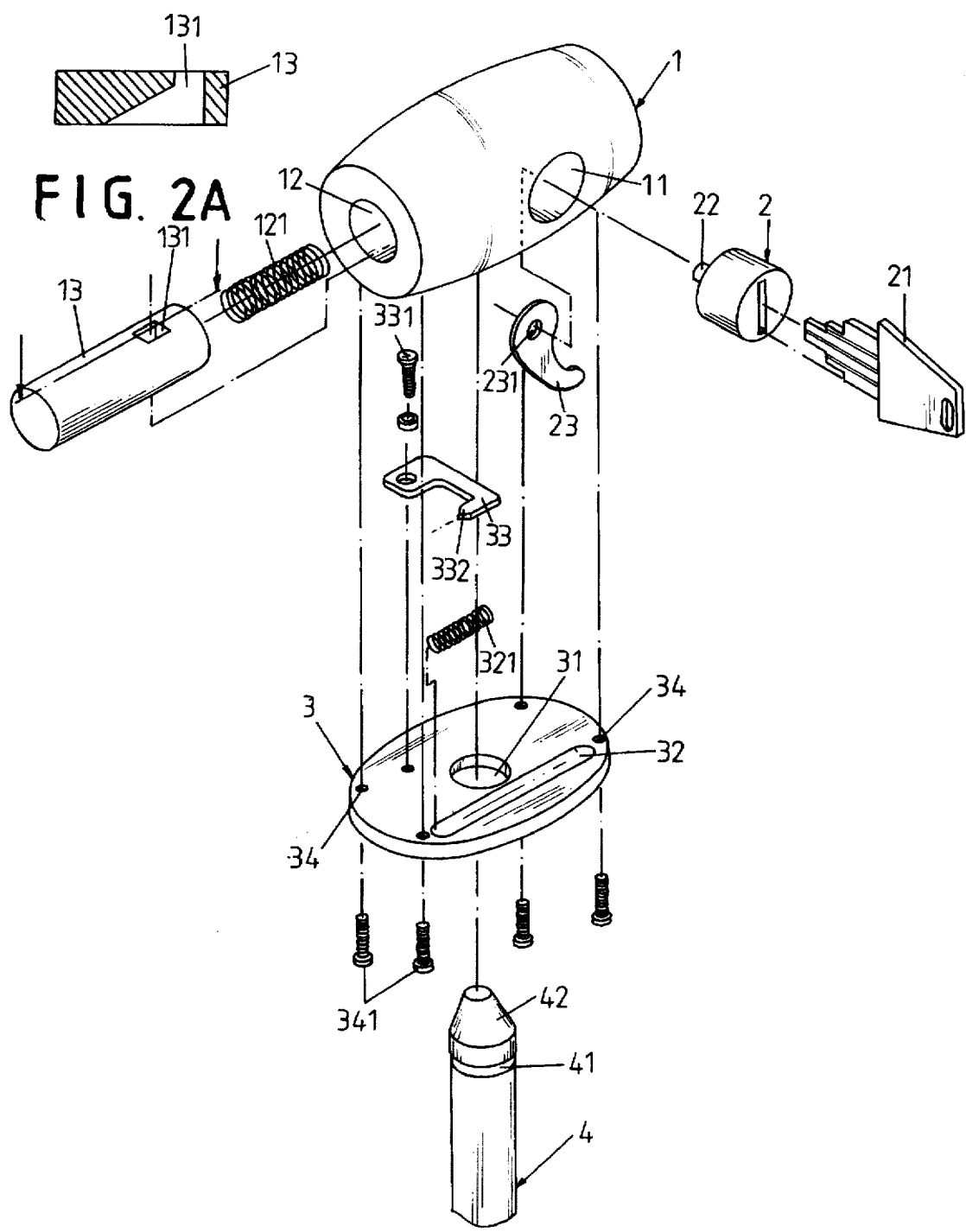
FIG. 2 is an exploded perspective view showing a auto-transmission shift lever locking device constructed in accordance with the present invention.

With reference to FIG. 2, there is shown an auto-transmission shift lever locking device in accordance with a preferred embodiment of the present invention. The locking device is mainly composed of an cover member 1, a locking driver 2, and a base member 3. The cover member 1 is provided with a first channel 11 and a second channel 12 formed thereon, both in communication with the space defined between the cover member 1 and the base member 3.

The locking driver 2 may be inserted into the first channel 11 of the cover member 1 and it is operated by a key 21. A rotatable driving rod 22 is connected on the front end of the locking driver 2. The rotatable driving rod 22 may be rotated by the key 21 through the locking driver 2. Further, the rotatable driving rod 22 is inserted into a through hole 231 of a driving member 23 so that the driving member 23 may be rotatable by the key 21 via the driving rod 22. The driving member 23 is just arranged above a concave slot 32 of the base member 3. In such an arrangement, the driving member 23 may be slidable above the concave slot 32 of the base member 3 by operating the key 21.

A hook member 33 is pivotally connected on the upper surface of the base member 3 by a screw 331, so that the hook member 33 may be rotatable about the screw 331 which is threaded to an inner-threaded hole of the base member 3. The hook member 33 is formed with a L-shaped tip portion 332 just positioned above the concave slot 32 of the base member 3. The tip portion 332 of the hook member 33 contacts with one end of a spring 321 which is positioned on one end of the concave slot 32 of the base member 3. So, the spring 321 may provide a biasing force to the hook member 33, thus the rear edge of the hook member 33 may contact with the driving member 23. A plurality of inner-threaded holes 34 are formed on the base member 3 for fixing the base member 3 by screws 341 to the cover member 1.

Figure 3:
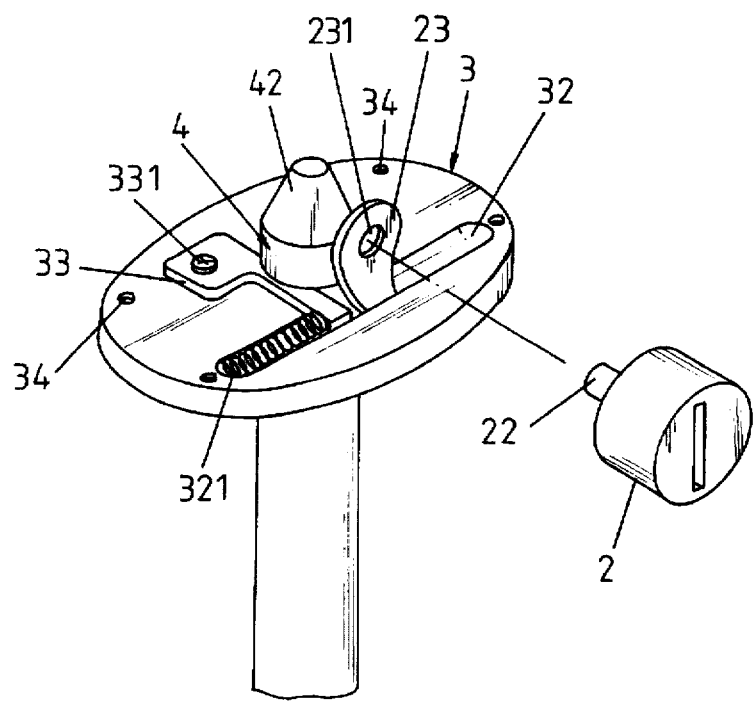
FIG. 3 is an exploded perspective view partially showing the locking structure at locked position of the present invention.

The shift lever 4 may be inserted into a central through hole 31 of the base member 3 during locking operation. A circumferential groove 41 is formed on the shift lever 4, and a truncated-conic end 42 is formed on the upper end of the shift lever 4. When the shift lever 4 is inserted into the central through hole 31, the rear edge of the hook member 33 may contact with the groove 41 by means of the biasing force of the spring 321, as shown in FIG. 3. That is, the locking structure is at locked position now.

Figure 4:
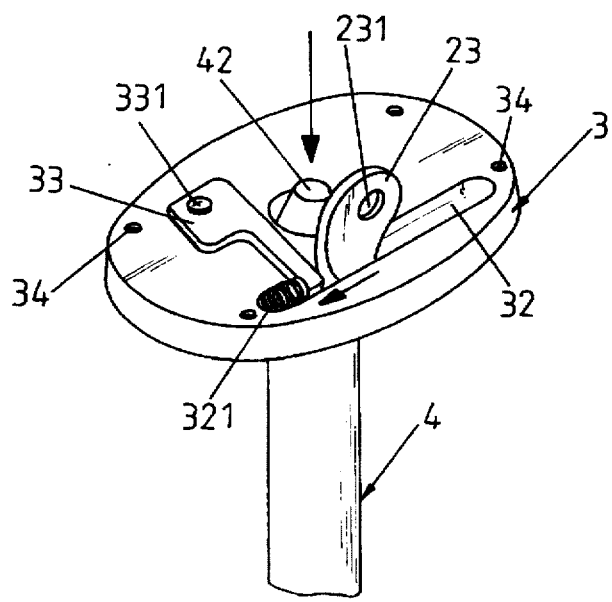
FIG. 4 is an exploded perspective view partially showing the unlocking structure at unlocked position of the present invention.

By using a correct key 21, the driving member 23 may be rotated to push the hook member 33 against the biasing force of the spring 321. At this time, the rear edge of the hook member 33 may release the circumferential groove 41 of the shift lever 4, as shown in FIG. 4, to allow the shift lever to be separated from the base member 3. That is, the locking structure is at unlocked position.

Figure 5:
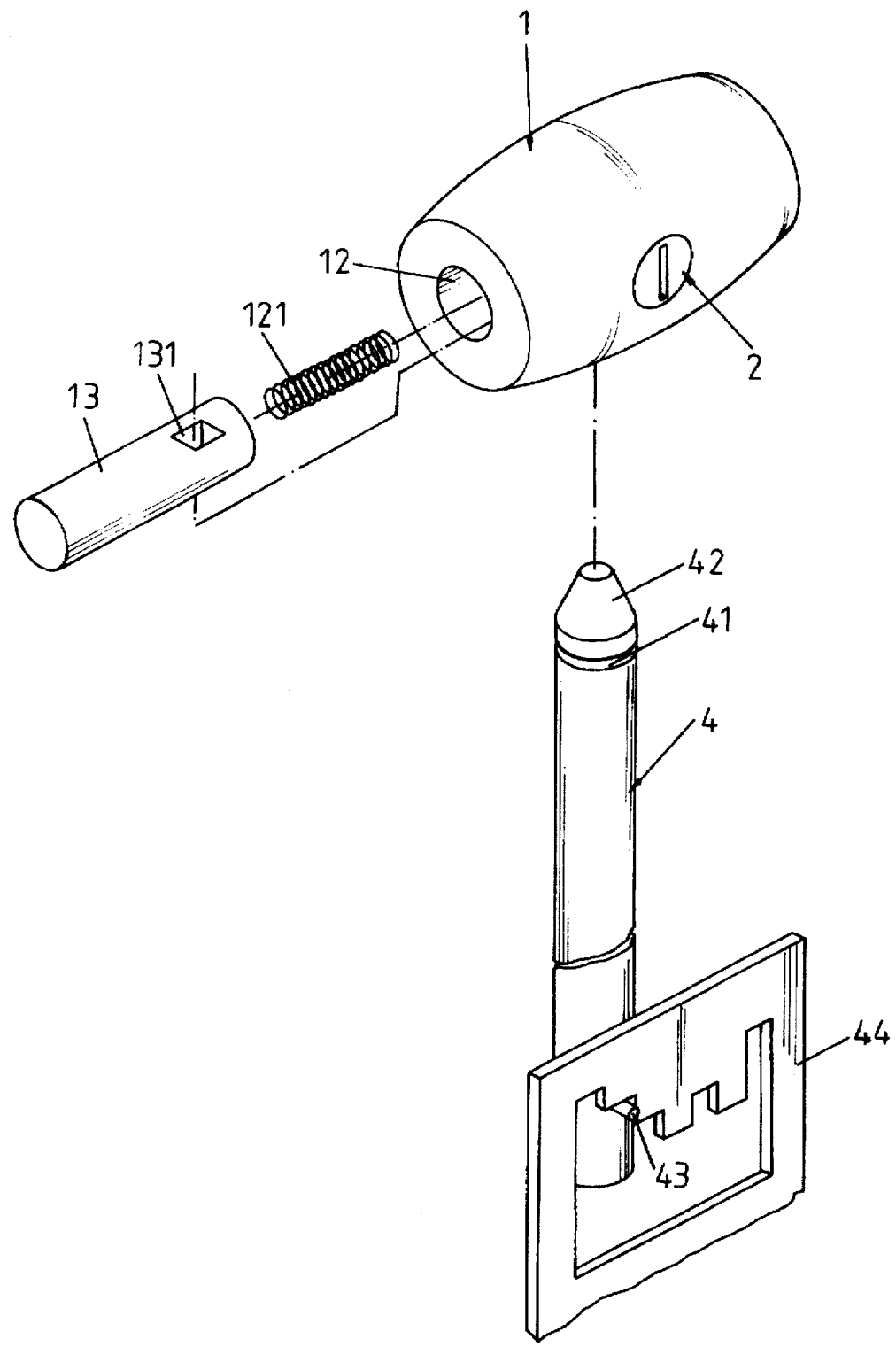
FIG. 5 is an exploded perspective view showing an auto-transmission shift lever locking device mounted to the shift lever of an automobile.

A shift enabling button 13, in the form of an elongated bar, is movably received within the second channel 12 with an outer end thereof exposed outside the second channel 12. The shift enabling button 13 has a slot 131 formed thereon, adapted to receive therein the upper end 42 of the shift lever 4. The slot 131 has formed therein at a lower portion thereof an inclined surface, as shown in FIG. 2A, to be in contact engagement with the truncated-conic, upper end 42 of the shift lever 4. When the present invention is at unlocked position described above, by moving the shift enabling button 13 toward the second channel 12 of the cover member 1, the engagement forces the shift lever 4 downward to release the engagement between a positioning peg 43 mounted to the shift lever 4 and a positioning member 44 (see FIG. 5) of the auto-transmission system to which the locking device of the present invention is adapted and thus allowing the shift lever 4 to switch to, a different position.

It is apparent that although the invention has been described in connection with the preferred embodiments, those skilled in the art may make changes to certain features of the preferred embodiments without departing from the spirit and scope of the invention as defined in the appended claims.

What is claimed is:

1. A locking structure for locking a transmission shift lever of an automobile, comprising:

a base member having a central through hole and a concave slot formed therein, mounted to an upper end of the shift lever in a relatively movable manner by having the upper end extending through the central hole of the base member, the upper end of the shift lever that extends through the central hole of the base member comprising a upper truncated-conic portion and a circumferential groove formed thereon below the truncated-conic portion;

a cover member secured to the base member by fastening means to define therebetween a space, the cover member having a first channel and a second channel formed therein;

a locking driver received in the first channel of the cover member, having a rotatable driving rod securely connected on the front end of the locking driver, the rotatable driving rod being rotatable by a key through the locking driver;

a driving member having a through hole connected to the driving rod of the locking driver, the driving member being arranged above the concave slot of the base member so that the driving member may be rotatable by the key via the driving rod;

a biasing spring positioned on one end of the concave slot of the base member;

a hook member adapted to lock the shift lever at the circumferential groove or unlock the shift lever, controlled by the driving member; and a shift enabling button, in the form of an elongated bar, movably received within the second channel with an outer end thereof exposed outside the second channel of the cover member, the enabling button having a slot adapted to receive therein the upper end of the shift lever, the button slot having formed therein at a lower portion thereof an inclined surface to be in contact and engagement with the truncated-conic portion of the shift lever so that by moving the shift enabling button toward the second channel of the cover member, the engagement forces the shift lever downward to further allow the shift lever to switch to a different position when the driving member is at an unlocked position.

2. The locking structure as claimed in claim 1, wherein the hook member is pivotally connected on an upper surface of the base member by a screw and rotatable about the screw, the hook member being formed with a rear edge and a L-shaped tip portion biased by the biasing spring toward the central through hole of the base member, and thus the rear edge of the hook member engages with the circumferential groove of the shift lever at a locked position, the hook member being at an unlocked position when the rear edge thereof is pushed by the driving member.

* * * * *